United States Patent Office 3,576,880
Patented Apr. 27, 1971

3,576,880
5(2,6,6-TRIMETHYL - 1 - HYDROXY-CYCLOHEX-2-ENYL) - 3 - METHYL-PENTA-2,4-DIEN-1-AL DERIVATIES
Basil Charles Leicester Weedon, Wimbledon, England, and Hans Mayer, Allschwil, and Ulrich Schwieter, Reinach, Switzerland, assignors to Hoffmann-La Roche Inc., Nutley, N.J.
No Drawing. Filed Feb. 6, 1968, Ser. No. 703,247
Claims priority, application Great Britain, Feb. 14, 1967, 7,094/67
Int. Cl. C07c 37/20, 49/20
U.S. Cl. 260—586                                    3 Claims

ABSTRACT OF THE DISCLOSURE

A process for producing abscission and abscission derivatives from the condensation product 2,6,6 - trimethyl-4-ethylenedioxy - 2 - cyclohexen-1-one and 3-methyl-pent-2-en-4-yn-1-ol.

BACKGROUND OF THE INVENTION

Abscissin and abscissin derivatives of the formula:

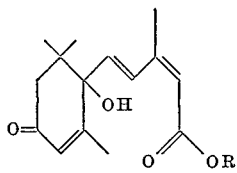

wherein R is hydrogen or lower alkyl, which are disclosed in Dutch Pat. No. 6,832, Nov. 17, 1967, and on page 51 of Chem. and Eng. News, Apr. 19, 1965, are known hormones for promoting the abscission or shedding of the fruit from a plant and for regulating the growth of plants. These compounds have proven valuable in agriculture due to the fact that by applying them to the plants, they cause the removal of the fruit from the tree or plant by shedding. Furthermore, the compounds of Formula I above counteract the effects of auxin in growth promotion.

However, a disadvantage in utilizing these compounds of Formula I above is these compounds can only be prepared by a long, complicated synthesis or by isolating them from their natural source, i.e., the fruit of the cotton plant. Therefore, it has been desired to supply a method for economically preparing the compound of Formula I above.

SUMMARY OF THE INVENTION

In accordance with this invention, it has been found that the abscission which has the formula:

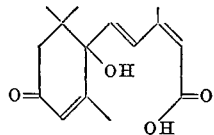

can be prepared either by oxidizing a keto-aldehyde compound of the formula:

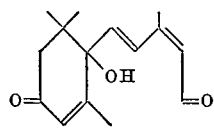

with silver oxide or by first oxidizing an aldehyde compound of the formula:

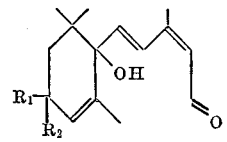

wherein $R_1$ and $R_2$ are lower alkoxy and taken together from lower alkylenedioxy with silver oxide to form a carboxy compound of the formula.

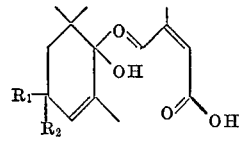

wherein $R_1$ and $R_2$ are as above and thereafter subjecting said carboxy compound to acid hydrolysis.

If desired, the compound of Formula I-A can be esterified to the compound of Formula I wherein R is lower alkyl e.g., by treating the compound of Formula I-A with a lower alkanol, a diazoalkane or an alkylhalide in the presence of a base.

The above process provides a simple and economic means for synthetically producing abscission and abscission derivatives.

DETAILED DESCRIPTION OF THE INVENTION

The used herein term lower alkyl includes both straight and branched chain saturated hydrocarbon groups containing from 1 to 6 carbon atoms such as methyl, ethyl, propyl, isopropyl, butyl, tert-butyl, etc. The term lower alkylene includes alkylene radicals containing from 2 to 6 carbon atoms, such as ethylene, propylene, butylene, etc.

The oxidation of the compound of the Formula II-A above is carried out by treating the compound of the Formula II-A above with silver oxide. This reaction is carried out by adding silver oxide, preferably in the form of a freshly prepared powder, to the compound of Formula II-A above. This reaction can be carried out in the presence of an inert organic solvent. Any conventional inert organic solvent can be utilized in carrying out this reaction. Typical organic solvents which can be utilized in carrying out this reaction include benzene, heptene, etc. If desired, an alkali metal hydroxide such as sodium or potassium hydroxide can be present in the reaction medium. In carrying out this reaction, temperature and pressure are not critical and this reaction can be carried out at room temperature and atmospheric pressure. Generally, it is preferred to utilize a temperature of from 0° C. to about 50° C.

The oxidation of the aldehyde compound of the Formula II-B above to the carboxy compound of the Formula II-C above is carried out by the same means that was utilized in oxidizing a compound of the Formula II-A above to abscission. In this procedure the compound of the Formula II-B is oxidized by silver oxide to form a carboxy compound of the Formula II-C.

The compound of the Formula II-C above can be converted into abscission by means of treating the compound of the Formula II–C with a mineral acid so as to convert the lower alkylenedioxy group or diloweralkoxy group to a keto group. Any conventional means of acid hydrolysis can be utilized to convert the compound of Formula II–C to the compound of the Formula I–A above. Generally, it is preferred to utilize a dilute mineral acid such as dilute sulfuric acid in the presence of an inert organic solvent. Any conventional inert organic solvent can be utilized in carrying out this reaction. Generally, it is preferred to utilize a solvent which is miscible in water, such as a lower alkanol which may be methanol, ethanol, etc. or a ketone such as acetone. In carrying out this reaction, temperature and pressure are not critical and the hydrolysis reaction can be carried out at room temperature and atmospheric pressure or at elevated or reduced temperatures and pressures.

The compound of Formula I–A can be converted into the compound of Formula I wherein R is lower alkyl by treating the compound of Formula I–A with an esterifying agent. Any conventional method of esterifying the compound of Formula I–A can be utilized in this process. Typical esterifying agents which can be utilized include diazoloweralkanes such as diazomethane, diazoethane; lower alkanols such as methanol, ethanol, isopropanol; or alkyl halides such as methyl iodide, ethyl bromide, in the presence of an organic or inorganic base. Any conventional inorganic or organic base can be utilized in conjunction with the alkyl halide esterifying agent. Among the inorganic bases which can be included in accordance with this invention are sodium hydroxide, potassium carbonate, pyridine, sodium methoxide, etc. Generally, it is preferred to carry out the esterification reaction in the presence of an inert organic solvent. Any conventional inert organic solvent can be utilized in carrying out this reaction. Among the preferred inert organic solvents which can be utilized are included diethyl ether, petroleum ether, methyl ethyl ketone, etc. In carrying out this reaction, room temperature and pressure are not critical. Therefore, this reaction can be carried out at room temperature and atmospheric pressure or at elevated temperatures and pressures. Generally, it is preferred to carry out this reaction at temperatures of from 0° C. to the boiling point of the solvent.

The compound of Formula II–A can be produced from a compound of the formula:

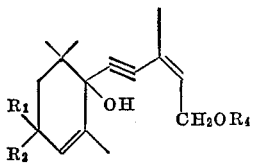

III wherein $R_4$ is

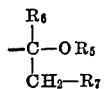

$R_5$ is lower alkyl; $R_6$ and $R_7$ are hydrogen or lower alkyl and together form trimethylene; and $R_1$ and $R_2$ are as above by the following reaction scheme:

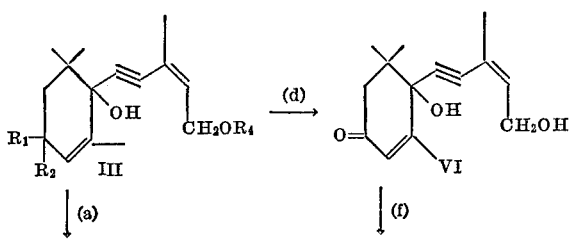

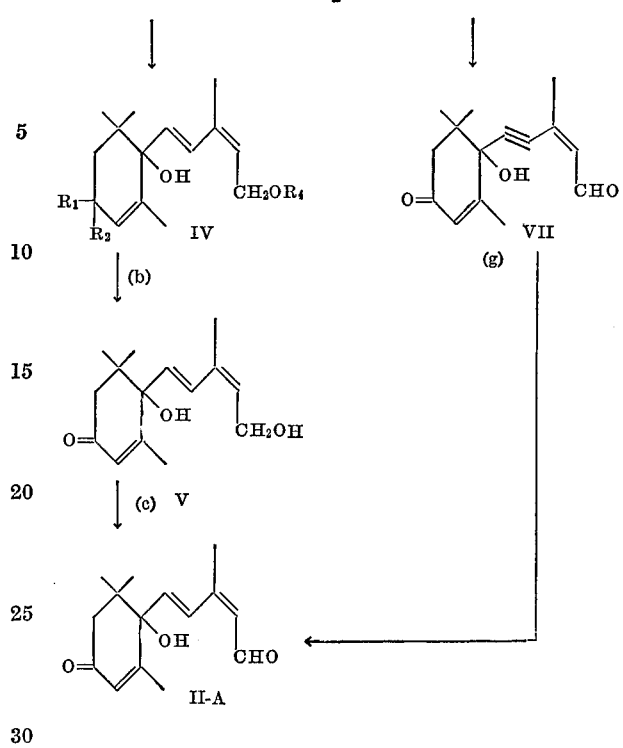

wherein $R_1$, and $R_2$ and $R_4$ are as above;

The compound of Formula III is converted to the compound of Formula IV, as in reaction step (a) by means of treating the compound of the Formula III above with an alkali metal aluminum hydride. In carrying out this reaction, any conventional alkali metal aluminum hydride such as lithium aluminum hydride, sodium aluminum hydride, etc. can be utilized as the reducing agent. In carrying out this reaction, temperature and pressure are not critical, and this reaction can be carried out at room temperature and atmospheric pressure or at elevated or reduced temperatures and pressures. Generally, it is preferred to carry out this reaction at a temperature of from −20° C. to +60° C. The reaction of step (a) is generally carried out in the presence of an inert organic solvent. Any conventional inert organic solvent can be utilized to carry out this reaction. Among the preferred solvents are the ethers such as tetrahydrofuran, diethyl ether, dioxane and the like.

The conversion of the compounds of the Formula IV above to compounds of the Formula V above, as in step (b) is carried out by means of dilute acid hydrolysis. Any conventional means of acid hydrolysis can be utilized to convert the compounds of Formula IV above to the compound of Formula V above. Generally, it is preferred to utilize a dilute mineral acid such as dilute sulfuric acid in the presence of an inert organic solvent. Any conventional inert organic solvent can be utilized in carrying out this reaction. Generally, it is preferred to utilize a solvent which is miscible in water such as a lower alkanol which may be methanol, ethanol, etc. or a ketone such as acetone. In carrying out this reaction, temperature and pressure are not critical and the hydrolysis reaction can be carried out at room temperature and atmospheric pressure or at elevated and reduced temperatures and pressures.

The conversion of compounds of the Formula V to compounds of the Formula II–A is carried out as in reaction step (c) by treating the compound of the Formula V with an oxidizing agent selected from the group consisting of manganese dioxide, chromic acid in pyridine and chromic acid in sulfuric acid. Generally, it is preferred to carry out this oxidizing reaction in the presence of an inert organic solvent. Any conventional inert organic solvent can be utilized in carrying out this reaction. Among the preferred inert organic solvents are the organic ethers such as hereinbefore mentioned. In carrying out the reaction of step (c), temperature and pressure are not critical, and this reaction can be carried out at room temperature and atmospheric pressure. If desired, elevated or reduced pressures and temperatures can be utilized. Generally, it is preferred to utilize a temperature of from —20° C. to +60° C.

The conversion of compounds of the Formula III above to compounds of the Formula VI above, is carried out in accordance with step (d), by means of treating the compound of the Formula III above with a dilute acid hydrolyzing agent. The dilute acid hydrolysis of step (d) is carried out in the same manner as that described in connection with step (b). The acid hydrolysis of steps (b) and (d) hydrolyze off the group $R_4$ as well as hydrolyze off the groups $R_1$ and $R_2$ when $R_1$ and $R_2$ represent a dialkoxy group or when taken together represent a lower alkylenedioxy group.

Compounds of the Formula VI above can be converted to compounds of the Formula II–A above in another manner. In this procedure compounds of the Formula VI above are first treated with an oxidizing agent as in step (c) to form compounds of the Formula VII. The oxidation of step (f) is carried out in the same manner as described in connection with the conversion of compounds of the Formula V above to compounds of the Formula II–A above as in step (c). The compounds of the Formula VII above are converted to compounds of the Formula II–A above as in step (g) by treating the compounds of the Formula VII above with a reducing agent, such as hydrogen in the presence of a catalyst. The catalyst is a partially deactivated palladium catalyst in the presence of quinoline, e.g. Lindlar's catalyst (U.S. Pat. No. 2,681,-938). The reaction of step (g) may be generally carried out in the presence of any conventional inert organic solvent, such as toluene, benzene, etc. In carrying out this reaction step (g), temperature and pressure are not critical and elevated or reduced pressures and temperatures can be employed, generally preferred temperatures being from 0° C. to 60° C.

Among the novel compounds produced by this invention which are covered by the Formula V is the compound 5-(2,6,6 - trimethyl - 1 - hydroxy-4-oxo-cyclohex-2-enyl) - 3 - methyl-penta-2-cis-4-transdien-1-ol. Among the novel compounds produced in accordance with this invention covered by the general Formula II–A is 5-(2,6,6-trimethyl - 1 - hydroxy - 4-oxo-cyclohex-2-enyl)-3-methyl-penta-2-cis-4-trans-dien-1-al.

Compounds of the formula:

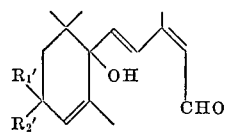

II wherein $R_1'$ and $R_2'$ are lower alkoxy and taken together form lower alkylenedioxy or oxo, can be prepared from compounds of the formula:

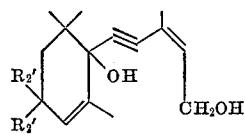

III–A wherein $R_1'$ and $R_2'$ are as above, by means of the following reaction scheme:

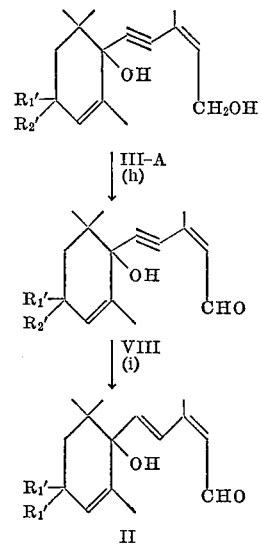

wherein $R_1'$ and $R_2'$ are as above;

The conversion of compounds of the Formula III–A to compounds of the Formula VIII, as in step (h), is carried out by treating the compound of the Formula III–A with an oxidizing agent as described with respect to step (c). The same conditions that were utilized in carrying out the reaction in step (c) is utilized in carrying out the reaction of step (h). The conversion of compounds of the Formula VIII to compounds of the Formula II, as in step (i), is carried out by treating compounds of the Formula VIII with catalytic hydrogen as described in step (g). The same conditions that are utilized in carrying out the reaction of step (g) are utilized in carrying out the reaction of step (i).

Compounds of the formula:

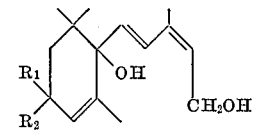

IX wherein R, and $R_2$ have the meaning given above, can be prepared by re-introducing the $R_1$ and $R_2$ groups into a compound of Formula V by reaction of the compound of Formula V with an alkylene glycol or an orthoformic ester in either case in the presence of an acid catalyst, e.g. p-toluene sulfonic acid. The reaction is generally carried out in an inert organic solvent such as benzene, water formed during the reaction being continuously removed.

Compounds of Formula II can then readily be obtained from the corresponding compound of Formula IX by oxidation following the method described above in reference to step (c).

Among the novel compounds produced by the invention covered by the general Formula IX above, is 5-(2,6,6-trimethyl-1-hydroxy - 4 - ethylene-dioxy-cyclohex-2-enyl) - 3 - methyl-penta-2-cis-4-trans-dien-1-ol. Among the novel compounds of Formula II produced in accordance with this invention is 5-(2,6,6-trimethyl-1-hydroxy-4-ethylene-dioxy-cyclohex - 2 - enyl)-3-methyl-penta-2-cis-4-trans-dien-1-al.

The compound of Formulas III and III–A is prepared by reacting a compound of the formula:

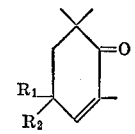

X wherein $R_1$ and $R_2$ are as above, with an organo methallic derivative of the compound of the formula:

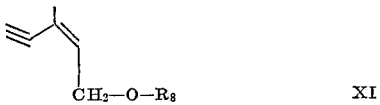

When $R_8$ in compounds of the Formula XI above is the formula:

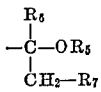

$R_5$, $R_6$ and $R_7$ are as above;

The reaction of compounds of the Formula X above, with the organo-metallic derivative of compounds of the Formula XI is carried out by simply adding the organo metallic derivative to the compound of Formula X above. This reaction can be carried out in an inert organic solvent at temperatures of from −30° C. to about 35° C. Generally it is preferred to carry out this reaction at room temperature. Any conventional inert organic solvent can be utilized as the reaction medium in accordance with this invention. Among the solvents suitable for this purpose are ethers such as those hereinbefore mentioned; chlorinated hydrocarbons such as methylene chloride, etc. If the organo metallic derivative is an alkali metal derivative, then the solvent can also be liquid ammonia.

In accordance with this invention, the organo metallic derivative of the compound of Formula XI can be either the conventional Grignard derivatives such as the magnesium halide derivatives, or the alkali metal derivatives such as the lithium derivatives.

The Grignard derivatives of compounds of the Formula XI can be prepared by the conventional methods of preparing Grignard reagents. The alkali metal derivatives can be prepared by convention means using an alkali metal amide in an inert medium such as any of the aforementioned solvents.

When $R_8$ in compounds of the Formula XI above is the protecting group, this compound is formed by the reaction of 3-methyl-pent-2-en-4-yn-1-ol, preferably the cis isomer, with a compound of the formula:

wherein $R_5$ and $R_7$ are as above; and $R_9$ is an alkyl group containing from 1 to 5 carbon atoms;

This reaction can be carried out at temperatures of from 0 to 25° C. in the presence of an acid catalyst. As acetic catalysts there can be employed, for example, mineral acids (such as sulfonic acid or phosphoric acid), strong organic acids (such as p-toluol sulfonic acid, oxalic acid, trichloro acetic acid), as well as so called Lewis acids (such as zinc chloride or boron trifluoride etherate). Generally, this reaction is carried out in the presence of an inert organic solvent. Any conventional inert organic solvent such as those hereinbefore mentioned can be utilized.

The compound of Formula III–A above wherein $R_1'$ and $R_2'$ taken together form an oxo group, can be prepared from the reaction product of the compound of Formula X above with the organo metallic derivative of the compound of Formula XI above by subjecting the reaction product to acid hydrolysis. This acid hydrolysis can be carried out in the same manner as described in reaction step (b). In this manner a compound of the Formula III–A above can be formed wherein $R_1'$ and $R_2'$ form an oxo group.

The term "lower alkoxy" as used herein includes both straight and branched chain alkoxy groups containing from 1 to 6 carbon atoms such as methoxy, ethoxy, isopropoxy, etc. When $R_8$ is a protecting group, the preferred protecting group is 1-methoxy-1-methylethyl.

The following examples illustrate the invention. The ether utilized in the examples is diethyl ether.

EXAMPLE 1

Lithium amide was prepared from 8.4 g. of lithium in 1 liter of liquid ammonia, 48 g. of cis 3-methyl-pent-2-en-4-yn-1-ol were added and the ammonia was replaced at the same time with ether. 19.6 g. of 2,6,6-trimethyl-4-ethylenedioxy-2-cyclohexen-1-one in 60 ml. of ether were added, the mixture was stirred for 16 hours at room temperature and poured into an ice-cold 10 percent solution of ammonium chloride. The product was extracted with ether, the ether layer washed four times with water, dried over sodium sulfate and evaporated. The residue was purified by chromatography on 2 kg. of silica gel (Merck 0.2–0.5 mm.). Excess cis 3-methyl-pent-2-en-4-yn-1-ol was eluted with a 1:1 mixture of petroleum ether and ether and the product was then eluted with ether. The product, cis 5-(2,6,6-trimethyl-1-hydroxy-4-ethylenedioxy-cyclohex-2-enyl)-3-methyl-pent-2-en-4-yl-1-ol, is a crystalline compound of melting point 109°–111° C.

10 g. of cis-5-(2,6,6-trimethyl-1-hydroxy-4-ethylenedioxycyclohex-2-enyl)-3-methyl - pent-2-en-4-yn-1-ol were stirred with 50 g. of manganese dioxide in 150 ml. of ether for 18 hours at room temperature. The reaction mixture was filtered and the ether evaporated. The crude cis 5 - (2,6,6-trimethyl-1-hydroxy-4-ethylenedioxy-cyclohex-2-enyl)-3-methyl-pent-2-en-4-yn-1-al was yellow oil.

The crude aldehyde obtained as described in the preceding paragraph was dissolved in 50 ml. of acetone and 10 ml. of 1 N sulfuric acid and stirred for 4 hours at 30° C. The resulting mixture was poured on to ice and extracted with ether. The ether layer was successively washed with water, dilute aqueous sodium bicarbonate and water, dried over sodium sulfate, filtered and evaporated to give cis 5-(2,6,6-trimethyl-1-hydroxy-4-oxo-cyclohex-2-enyl)-3-methyl-pent-2-en-4-yn-1-al as a yellow oil, which crystallises from a mixture of petroleum ether/ether to give crystals of melting point 91–93° C.

The foregoing cis 5-(2,6,6-trimethyl-1-hydroxy-4-oxo-cyclohex-2-enyl)-3-methyl-pent-2-en-4-yn-1-al was dissolved in 50 ml. of toluene and hydrogenated in the presence of 2 g. of Lindlar's catalyst and 0.5 ml. of quinoline until the hydrogen uptake had ceased. The mixture was filtered and the solvent evaporated at 25° C. in vacuo to give 5-(2,6,6-trimethyl-1-hydroxy-4-oxo-cyclohex-2-enyl)-3-methyl-penta-2-cis-4-trans-dien-1-al as a yellow oil.

6.5 g. of the 5-(2,6,6-trimethyl-1-hydroxy-4-oxo-cyclohex-2-enyl)-3-methyl - penta-2-cis-4-trans-dien-1-al were treated with 12 g. of freshly prepared silver oxide. The resulting mixture was stirred at room temperature for 8 hours, poured on to ice and extacted with dichloromethane. The dichloro-methane solution was extracted with 0.5 N sodium hydroxide and the aqueous alkaline phase was neutralized with dilute sulfuric acid and again extracted with dichloro-methane. The dichloro-methane solution was washed four times with water, dried over sodium sulfate, filtered and evaporated. The residue was crystallized from dichloro-methane/(petroleum ether) to give 5-(2,6,6-trimethyl-1-hydroxy-4-oxocyclohex-2-enyl)-3-methyl-penta-2-cis-4-trans-dien-1-oic acid of melting point 187–189° C.

EXAMPLE 2

48 g. cis-3-methyl-pent-2-en-4-yn-1-ol was treated with 25 mg. of p-toluol-sulfonic acid in 0.3 ml. abs. methanol and afterwards with 39.5 g. isopropenyl-methyl ether at 5–15° C. under stirring. Thereafter the stirring was continued for 10 minutes at room temperature.

The solution thus obtained was added dropwise to a suspension of lithium amide in liquid ammonia (prepared in usual manner from 3.8 g. of lithium and 300 ml. of liquid ammonia). The reaction mixture was stirred for 1½ hours, then 100 g. of 2,6,6-trimethyl-4-ethylenedioxy-2-cyclohexen-1-one in 100 ml. abs. ether was added dropwise and the reaction mixture stirred again for 2 hours at room temperature. Excess ammonia was then evaporated off and at the same time ether is added, and the reaction mixture was then poured on to water. The ethereal solution was washed several times with water, dried over potassium carbonate, filtered, and evaporated under vacuum to give 175 g. of cis-1-(2,6,6-trimethyl-1-hydroxy-4-ethylenedioxy-cyclohex-2-enyl) - 5 - (1-methoxy-1-methylethoxy)-3-methyl-pent-3-en-1-yn as a light yellow oil.

230 g. of cis-1-(2,6,6-trimethyl-1-hydroxy-4-ethylenedioxy-cyclohex-2-enyl)-5-(1-methoxy-1-methyl - ethoxy)-3-methyl-pent-3-en-1-yn, obtained as described above, in 650 ml. abs. ether was added at a temperature of —20° C. to a solution of 26 g. of lithium aluminum hydride in 1.4 l. of absolute ether. The mixture was then stirred for 24 hours at room temperature and ethyl acetate was added until excess lithium aluminum hydride was completely destroyed, whereupon the mixture was poured onto ice-cold dilute 1 N sulfuric acid and extracted with ether. The ether extract was washed successively with water, 5 percent aqueous sodium hydrogen carbonate solution and water. After drying over sodium sulfate, the solution was concentrated in vacuo, the residue obtained (183 g.) was taken up in 1 liter of acetone and 200 ml. of 1 N sulfuric acid was added. After 2 hours stirring, the mixture was diluted with water, extracted with ether and the ether layer washed with water, aqueous sodium hydrogen carbonate and water. After drying over sodium sulfate, the solution was filtered and the solvent evaporated in vacuo. Crude 5-(2,6,6-trimethyl-1-hydroxy-4-oxo - cyclohex - 2-enyl)-3-methyl-penta-2-cis-4-trans-dien-1-ol was obtained as a yellow oil, which crystallises from a mixture of petroleum ether/ether as colourless crystals of M.P. 126–128° C.

20 g. of the crystalline product thus obtained was dissolved in 1.5 l. of methylene chloride, 200 g. of pyrolusite (manganese dioxide) were added whereupon the mixture was shaken overnight at room temperature. After filtering and evaporating the solvent, 19.5 g. of a light yellow residue was obtained. Recrystallization from ether gave the 5-(2,6,6-trimethyl-1-hydroxy-4-oxo-cyclohex-2 - enyl)-3-methyl-penta-2-cis-4-trans-dien-1-al as colorless needles of M.P. 113–115° C.

6.5 g. of the 5(2,6,6-trimethyl-1-hydroxy-4-oxo-cyclohex-2-enyl)-3-methyl-penta-2-cis-4-trans-dien-1 - al were dissolved in 40 ml. of methanol and treated with 6 g. of freshly prepared silver oxide. The resulting mixture was stirred at 0° C. for 30 minutes, poured on to ice and extracted with dichloro-methane. The dichloro-methane solution was then extracted with 0.5 N sodium hydroxide and the aqueous alkaline phase was acidified with dilute sulfuric acid and again extracted with dichloromethane. The dichloro-methane solution was washed four times with water, dried over sodium sulfate, filtered and evaporated.

The residue was crystallized from dichloro-methane/petroleum ether to give 5-(2,6,6-trimethyl-1-hydroxy-4-oxo-cyclohex-2-enyl)-3-methyl-penta-2-cis-4-trans - dien-1-oic acid of melting point 187–189° C.

EXAMPLE 3

1.5 g. of the 5-(2,6,6-trimethyl-1-hydroxy-4-oxo-cyclohex-2-enyl)-3-methyl-penta-2-cis-4-trans-dien-1 - oic acid prepared as described in Example 2 were dissolved in ether and treated with an excess of diazomethane. The mixture was maintained at about 10° C. for 2 hours, after which evaporation followed by recrystallization from ether/petroleum ether gave colorless crystals of the methyl ester of 5(2,6,6-trimethyl-1-hydroxy-4-oxo-cyclohex - 2-enyl)-3-methyl-penta-2-cis-4-trans-dien-1-oic acid, melting point 89–91° C.

We claim:
1. A polyene compound of the formula:

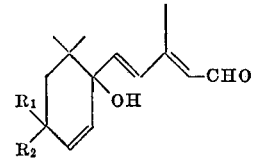

wherein $R_1$ and $R_2$ are lower alkoxy having from 1 to 6 carbon atoms and taken together form oxo or lower alkylenedioxy containing from 2 to 6 carbon atoms.

2. The compound of claim 1, wherein said compound has the formula:

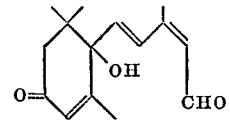

3. The compound of claim 2 wherein said compound is 5-(2-,6,6-trimethyl-1-hydroxy-4-oxo-cyclohex-2-enyl) - 3-methyl-penta-2-cis-4-trans-dien-1-al.

References Cited

Cainelli, et al., "Chemical Abstracts," vol. 68 (1968), col. 30040.

Roberts, et al., "Jour. of Org. Chem.," vol. 33 (9), 1968, pp. 3566–69.

ALEX MAZEL, Primary Examiner

J. H. TURNIPSEED, Assistant Examiner

U.S. Cl. X.R.

260—141, 338, 340.7, 340.9, 468, 488, 514, 611

UNITED STATES PATENT OFFICE
CERTIFICATE OF CORRECTION

Patent No. 3,576,880     Dated April 27, 1972

Inventor(s) Weedon, Mayer and Schwieter

It is certified that error appears in the above-identified patent and that said Letters Patent are hereby corrected as shown below:

Column 2, line 20 of formula II-C

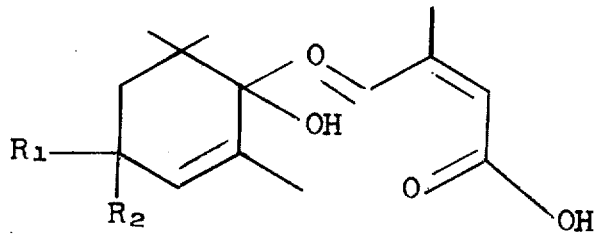

should be

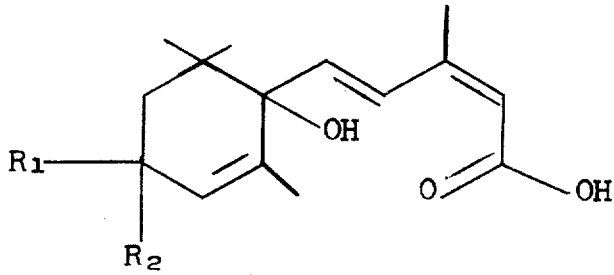

Signed and sealed this 26th day of September 1972.

(SEAL)
Attest:

EDWARD M. FLETCHER, JR.
Attesting Officer

ROBERT GOTTSCHALK
Commissioner of Pat